No. 697,620. Patented Apr. 15, 1902.
W. M. GREEN, J. R. GENT & H. A. POPPENHUSEN.
FURNACE.
(Application filed Feb. 20, 1901.)
(No Model.) 5 Sheets—Sheet 3.

Witnesses:
Carl H. Crawford
William H. Hall

Inventors:—
William M. Green
John R. Gent
Herman A. Poppenhusen
by Poole & Brown
their Attorneys No. 697,620. Patented Apr. 15, 1902.
W. M. GREEN, J. R. GENT & H. A. POPPENHUSEN.
FURNACE.
(Application filed Feb. 20, 1901.)

(No Model.) 5 Sheets—Sheet 4.

Witnesses:—
Carl H. Crawford
William H. Hall

Inventors:—
William M. Green
John R. Gent
Herman A. Poppenhusen
by Poole & Brown their Attorneys

UNITED STATES PATENT OFFICE.

WILLIAM M. GREEN, OF EVANSTON, JOHN R. GENT, OF CHICAGO, AND HERMAN A. POPPENHUSEN, OF EVANSTON, ILLINOIS.

FURNACE.

SPECIFICATION forming part of Letters Patent No. 697,620, dated April 15, 1902.

Application filed February 20, 1901. Serial No. 48,060. (No model.)

*To all whom it may concern:*

Be it known that we, WILLIAM M. GREEN, of Evanston, JOHN R. GENT, of Chicago, and HERMAN A. POPPENHUSEN, of Evanston, in the county of Cook and State of Illinois, have invented certain new and useful Improvements in Furnaces; and we do hereby declare that the following is a full, clear, and exact description thereof, reference being had to the accompanying drawings, and to the letters of reference marked thereon, which form a part of this specification.

This invention relates to improvements in furnaces of that kind provided with a grate constructed to impart to the fuel a progressive movement from the front toward the rear end of the grate while combustion is taking place.

Our invention is herein shown as applied to the construction of traveling grates shown in the prior United States Letters Patent No. 637,108, granted November 14, 1899, to William M. Green and John R. Gent; but it will be understood that the invention may be adapted to other forms of grates which operate to give to the fuel a progressive rearward movement in the furnace during combustion thereof.

As shown in the drawings, A A indicate the side walls of a boiler-furnace; B, the bridge-wall thereof; C, the front wall of the furnace, and D a fire-arch located inside of said front wall C, over the front part of the grate.

The grate here shown is mounted on an endwise-movable carriage, which is supported on wheels that travel on tracks A', supported at the sides of the furnace. Such carriage embraces a frame consisting of two longitudinal side pieces E and suitable cross-girths of usual construction. (Not shown.)

F F' designate two horizontally-arranged parallel sprocket-wheel shafts, arranged one at each end of the frame. Said shafts carry a plurality of sprocket-wheels $F^2$ $F^3$, which support and give movement to the traveling grate.

The grate is made up of a plurality of short pivotally-connected grate-bars, herein called "link-bars," G G', which extend longitudinally of the grate and are pivotally connected with each other in overlapping relation by means of transverse pivot-rods $G^3$, which extend from side to side of the furnace. The link-bars thus connected form an endless belt the upper part or lap of which constitutes the fuel-supporting surface of the grate. The links G' G' are unlike the links G, being spaced wider apart and having hubs adapted to engage the several sprocket-wheels $F^2$ $F^3$, the teeth of which enter the spaces between said bars. The links G' constitute the greater part of the fire-surface of grate and fill the spaces between the sets of links G. The upper or outer edges of the links are flanged or widened to form supporting-surfaces for the fuel and are uniformly separated to permit the passage of air therethrough to the body or layer of fuel supported on the grate. The details of the link-bars and the manner of connecting the same to their transverse pivot-rods $G^3$, as herein illustrated, are fully described in said prior Letters Patent No. 637,108 and need not here be further referred to.

The grate is supported in its parts intermediate to the supporting and actuating sprocket-wheels by means of horizontal transversely-arranged bearing-rollers H H', journaled in bearings in the side members of the grate-supporting frame, the rollers H being located beneath the upper and the rollers H' beneath the lower lap thereof.

The means for driving the endless traveling grate are not herein shown; but it will be understood that said grate may be driven in the manner shown in said prior patent or by other suitable means, as found most convenient or desirable.

At the forward end of the furnace is located a fuel-hopper L, which extends over the forward horizontal top portion of the traveling belt. At the rear or inner part of the hopper is a sliding gate J, which serves to control the feed-opening of the furnace and to regulate the amount of fuel delivered to the fire-surface of the traveling grate from the hopper.

In furnaces of this character when the coal is delivered upon the grate and while it is under the fire-arch D the heat of the furnace acts to first drive off the volatile gases from the coal, and the resulting coke is burned as it moves rearwardly with the grate, the ashes and clinkers being discharged from the rear end of the grate into the ash-pit below. The effect of so coking the fuel is to appreciably shrink or decrease the volume thereof, the amount of shrinkage depending upon the character of coal employed. As a result of such shrinkage in coal having a large percentage of volatile gases, the body of coked fuel as it passes to the middle and rear portions of the grate becomes divided or separated into masses, between which are spaces or crevices of larger or smaller size, depending upon the character of coal employed and the extent of its progress through the furnace. This condition of the fuel-bed permits the air to pass so freely upwardly through the spaces or crevices between the masses that the oxygen needed to support combustion fails to reach the portions of the fuel within such masses. Furthermore, in freely-burning coals the thickness of the fuel-bed gradually decreases from front to rear of the grate, so that the air passes too freely through the thinner parts of the bed and is deflected from the thicker parts thereof, with the result of a lack of air-supply to the part of the fuel-bed rested on the forward part of the grate. Moreover, in the use of coal having a relatively large percentage of fixed carbon and proportionately smaller percentage of volatile matters the fuel-bed after the fuel is freed from its volatile matter tends to coke or become incrusted and as it progresses through the furnace is broken into relatively large masses, which are separated by wide crevices. In this condition of the fuel-bed the air passes too freely through such crevices, and by reason of the presence of such crevices and of the large size of the lumps or masses of fuel the air is prevented from mingling intimately and uniformly with the fuel.

One of the objects of our invention is to provide means acting to check or retard the progressive movement of the individual masses constituting the fuel-bed, so that said masses are brought into closer relationship and the fuel-bed condensed or made more compact as it approaches the rear end of the grate, with the result of effecting a more uniform distribution of the air to all parts of the bed. Our invention also includes means designed to agitate the masses constituting the bed, so as to expose all sides of said masses to the action of the air and also break up the masses into smaller fragments, and thereby provide for a more uniform supply of air thereto and more intimate commingling of the air with the fuel. This result is effected by the interposition between the delivery end of the grate and the discharge end thereof, and in the path of the progressing fuel-bed a resisting means having such retarding effect as to partially but not wholly overcome the friction between the grate and the fuel-bed. The effect of such resisting means is to somewhat retard the progress of the fuel over the grate, with the result of longitudinally compressing the fuel-bed in a manner to move the separated masses thereof closer together, and thereby give homogeneous or uniform character to the body of burning fuel. In this condition of the fuel the air will act uniformly on all parts of the bed and will not be permitted to escape in large quantities through certain parts thereof. Moreover, such resisting means also operates to overturn the masses of fuel and cause the same to grind one upon the other and be thereby reduced in size and to be exposed more uniformly to the action of the air. Such resisting means may be variously constructed and will be so located and proportioned to the friction between the fuel and grate as not to entirely overcome said friction, and thereby entirely stop progress of the fuel over the grate. Said resisting means will, moreover, be so constructed that the ashes will be continuously discharged from the rear end of the grate during the operation of the furnace, whereby such operation or any part of it need not be discontinued for the purpose of cleaning or removing the ashes.

We have herein shown as one means for producing the result stated a transversely-disposed dam or obstruction located between the delivery and discharge ends of the grate and which rises obliquely from the surface of the grate and extends from one side of the grate to the other. Said dam may and as herein shown does incline downwardly from the highest part thereof toward the rear of the furnace, thereby constituting two inclined planes, the rear part of said dam in the construction herein illustrated overhanging the ash-pit below and discharging thereinto.

Means are desirably provided for feeding air to the fuel through said dam as it passes thereover, whereby the capacity of the grate to furnish air to support combustion is not impaired. The dam, while herein shown as located at the rear end of the grate, may be otherwise located.

The form of dam herein shown is made up of a plurality of separate bars K K' K² K³, which are arranged side by side parallel with the longitudinal rows of links comprising the grate and filling the space between the side walls A A of the furnace. Said bars consist each of two rigidly-connected and angularly-disposed arms which are inclined downward in opposite directions from the highest points thereof and are suspended at their angles upon a girder L, which extends transversely over the grate and is supported at its opposite ends in the side walls of said furnace. Said girder is preferably of cast metal and is made of open construction to permit air to pass therethrough freely to the parts located above the same. The girder is shaped on its upper surface to conform to the engaging surfaces of the bars K to K³. The upper edges of the bars when assembled form two continuous oppositely-disposed inclined surfaces, the forward one of which constitutes a continuation of the grate-surface and from the rear one of which the ashes are discharged into the ash-pit below. The bars K to K³ rest at their forward ends on the longitudinal rows of link-bars constituting the grate. The bars K K' engage at their forward ends the link-bars G', which occupy the spaces between the driving sprocket-wheels, while the forward ends of the bars K² K³ engage the driving link-bars G. As the driving link-bars are made wider than the link-bars G', the bars K² K³ are made correspondingly thicker than the bars K K'. Said several bars are provided on their side faces with lugs $k$, which engage corresponding lugs on the adjacent bars in such manner as to maintain uniform air-spaces between the bars and at the same time insure the retention of said bars in their proper lateral positions. If desired, all of the bars K to K³ may be movable in order to prevent the air-spaces between the same from being clogged by ashes falling between the same; but in practice we have found that this object is secured to a satisfactory degree by making each alternate bar movable and the other bars stationary. As herein shown, the bars K K² are so supported as to be capable of oscillatory movement, while the bars K' K³ are stationary.

The means illustrated in Figs. 1 to 5 for imparting movement to the bars K K² consists of arms K⁴ K⁵, which depend from the bars K K² and are adapted for actuation by the rear ends of the links of the grate-bars at the time the bars turn downwardly at the rear end of the grate in passing around the sprocket-wheels there located, the overlapping connection of said links causing said rear ends of the links at this time to rise above the plane of the fire-surface of the grate and to engage and raise the arms and the rear ends of the connected bars, which latter swing or turn on the girder L when the bars are so moved. The several bars are held in engagement with the girder L by means of a longitudinal flange or rib $l$ on the upper part of the front face of said girder, which rib is engaged by lugs $k'$ $k'$, which project downwardly and rearwardly from the bars K to K³ in hooked form, so as to hold the bars from being disengaged from the girder by the lifting of their front ends. Lugs $k^2$ are provided on the stationary bars, Fig. 6, to hold the latter from being shifted forwardly, said lugs $k^2$ engaging the rear surface of the girder. The movable or oscillatory bars have contact-edges $k^3$, Figs. 4 and 5, at the upper ends of the arms K⁴ K⁵ to similarly hold the said movable bars from being shifted forward out of place. The front lower surface of the rib $l$ on the girder is made concave in form, and the contact-faces of the lugs $k'$ $k'$ are correspondingly shaped. This construction in the case of the oscillatory bars enables the same to be freely moved, while retaining them positively in engagement with the girder, it being obvious that as the forward ends of the movable bars rest on the link-bars of the traveling grate when the rear ends of said bars are lifted the bars will be swung or oscillated about their forward ends and the central part of the bars will be lifted from the top surface of the girder, although retained in position with respect thereto by the engagement of the lugs $k'$ with the rib $l$, as clearly seen in Fig. 5, from which it will be seen that the rear edges of the lugs $k'$ and the bearing edge $k^3$ at the upper ends of the arms K² K³ are arranged obliquely and generally parallel with each other and also approximately in curved lines or arcs concentric with the front ends of the arms, thereby permitting oscillatory movement of the arms in the manner set forth, while preventing forward or backward displacement of the arms with respect to the girder supporting them. When the rear ends of the movable bars are raised, the bars will not move forwardly, because of the pressure exerted by the rearwardly-moving bed of fuel, and when said rear ends of the bars are permitted to drop under the weight of the rear ends thereof and the fuel resting thereon the complemental curved bearing-surfaces of the bars and girder act as guides to return the bars accurately in place. Said curved bearing-surfaces of the stationary bars and the girder also act to prevent the heavier rear ends of the bars from overbalancing the bars when the grate is not in use. The said bearing-surfaces furthermore prevent the bars from being forced rearwardly over the girder by the pressure due to the rearwardly-moving fuel-bed.

In order to hold the bars K to K³ in their proper relative positions with respect to each other, the movable bars are provided with lateral projections $k^4$, which are attached to or formed on the actuating-arms thereof and are so located as to normally engage the lower margins of adjacent bars when said movable bars are elevated to their highest positions by the means described. With this construction if it should occur that the rear ends of the stationary bars should become depressed below their normal positions the engagement of the lateral projections $k^4$ therewith at the time the movable bars are elevated acts to raise the displaced bars to their proper positions.

Figure 1:
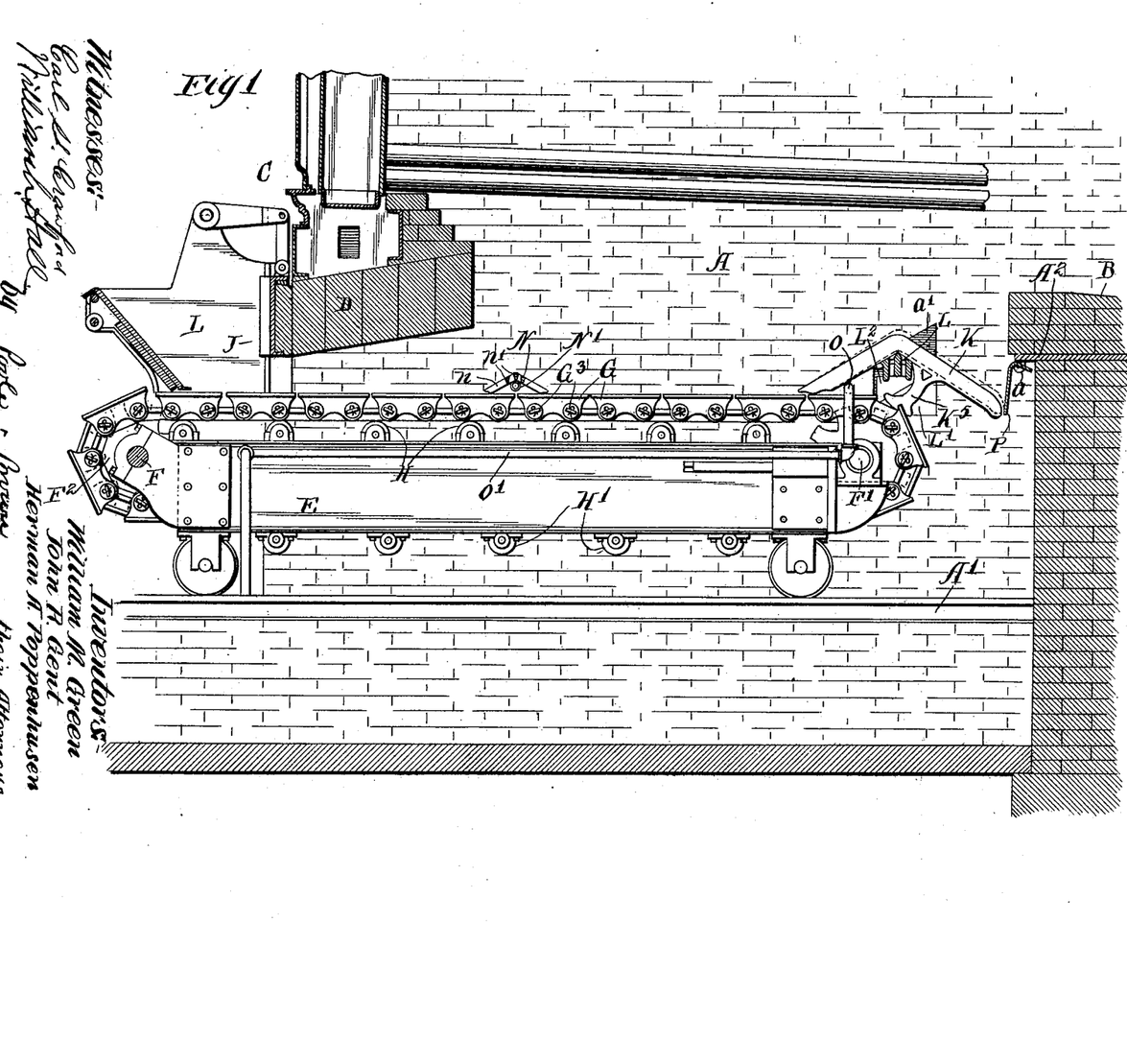
Figure 1 is a vertical longitudinal section of a boiler-furnace, illustrating therein a chain or traveling grate provided with our invention.
Figure 2:
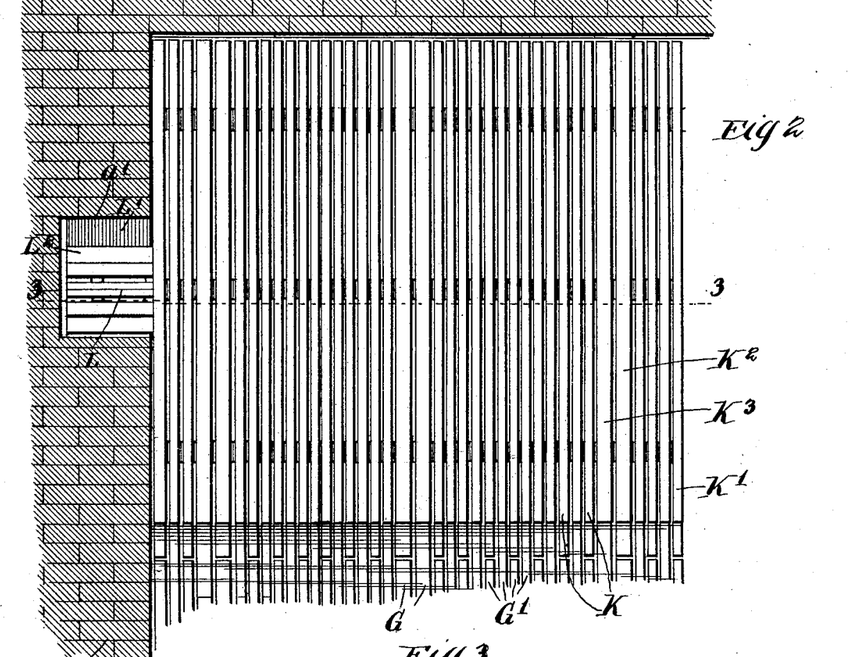
Fig. 2 is a plan view of the rear end of the grate and our improved attachments therefor, showing the furnace-walls in horizontal section.
Figure 3:
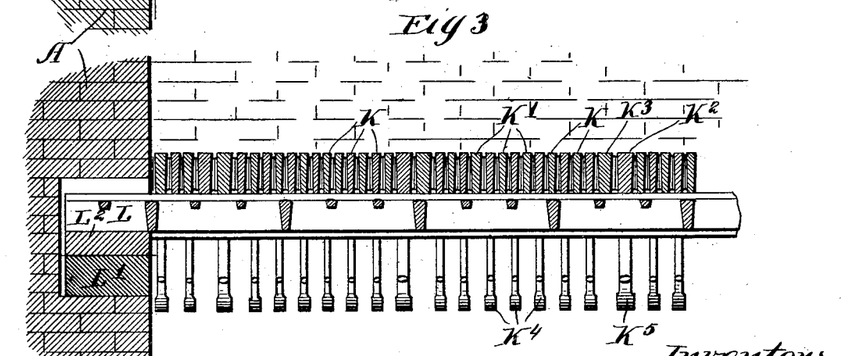
Fig. 3 is an enlarged vertical section on line 3 3 of Fig. 2.
Figures 4, 5, 6:
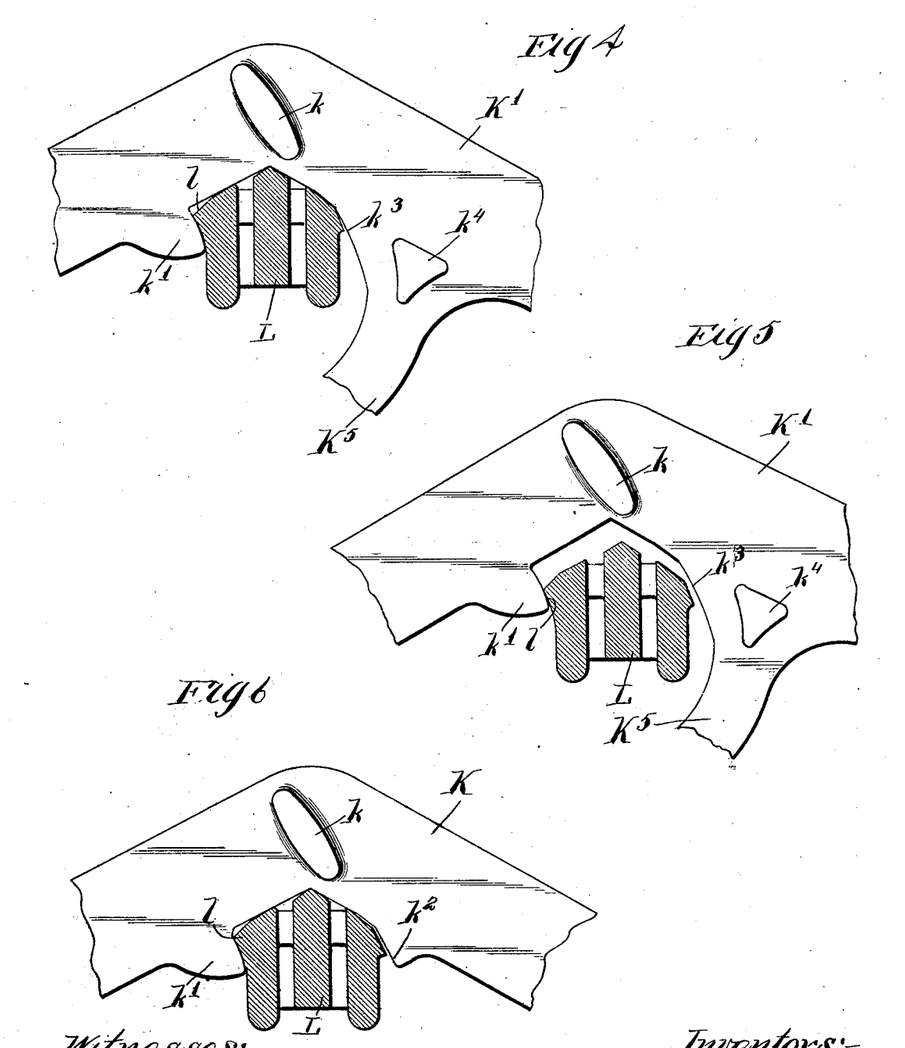
Figs. 4 and 5 are fragmentary detail views of the movable bars forming part of a fuel-retarding device, showing the means of supporting the same.
Fig. 6 is a similar view of one of the stationary bars forming part of said retarding device.
Figures 7, 8:
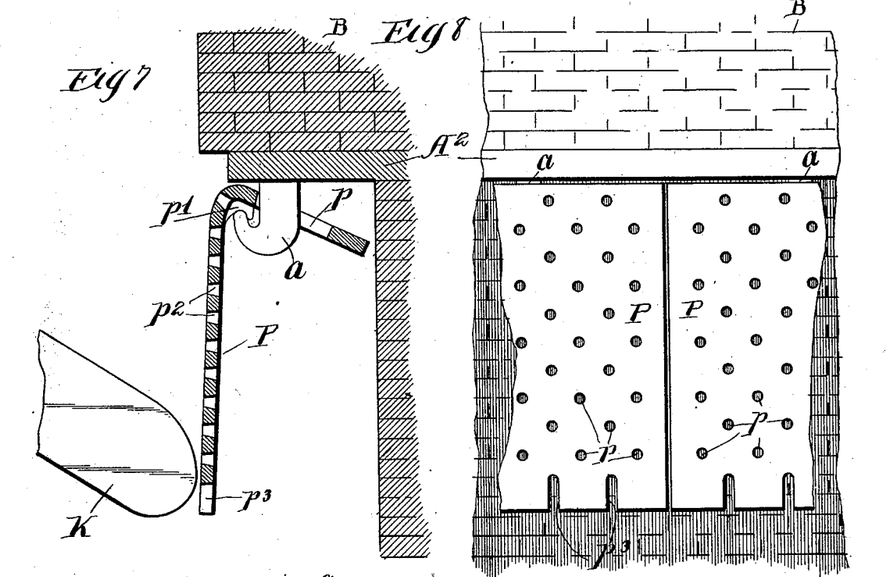
Figs. 7 and 8 are fragmentary details showing one form of damper, located at the rear end of the grate.

Fig. 5 illustrates the raised position of the movable bars, and this position is also illustrated in dotted lines in Fig. 1. The weight of the bars in rear of the girder is so proportioned as to return the bars to their lowermost positions when the links move out of engagement with the bar-actuating arms. The weight of the fuel on the bars and the pressure due to the rearward progress of the fuel-bed also aids to depress the bars to their lowermost positions. The foregoing is a convenient mode of actuating the bars when a traveling grate, such as is herein shown, is employed.

Figure 9:
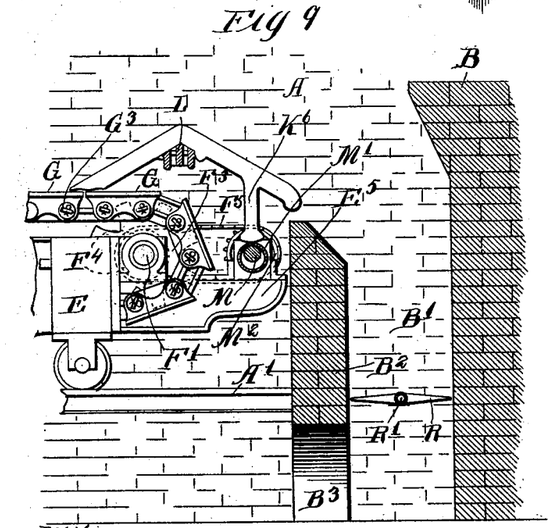
Figs. 9 and 10 are fragmentary details showing a modified form of resistance device and means for actuating the same, and also a modified form of damper.
Figure 10:
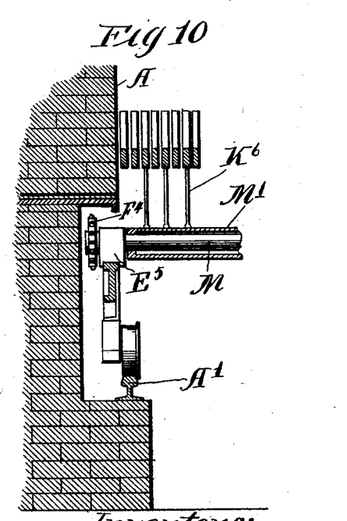

In Figs. 9 and 10 we have shown another mode of actuating the movable or oscillatory bars embracing a rotative shaft M, which is mounted at its ends in bearings attached to or formed on extensions $E^5$ of the side members E of the grate-frame. Surrounding said shaft from one end thereof to the other is an eccentrically-disposed sleeve M', and each alternate bar is provided near its rear end with a depending arm $K^6$, which engages said sleeve, whereby the bars having said arms are oscillated during each rotation of the shaft. Other means of actuating the bars from the rotative shaft may be employed. Said shaft is rotated from the rear sprocket-wheel shaft F' through the medium of sprocket-wheels $F^4$ and $M^2$ on the shafts F' and M, respectively, and a sprocket-belt $F^5$, trained about said wheels. In this latter construction the dam may be located somewhat nearer the rear end of the grate than in the first-described form, and thereby permits a greater area of the grate-surface to be utilized. In either embodiment of the invention shown, however, it will be observed that by reason of the construction of the dam its attachment to the grate does not decrease the effective area of the grate, because the inclined surfaces of the dam constitute, in effect, an extension of the grate-surface and are constructed to permit the air to pass freely therethrough to the part of the fuel-bed which it supports. It will be understood, however, that the location of the resistance-dam with respect to the front and rear ends of the grate may be varied to suit any particular construction of the furnace in connection with which the dam is used and will be varied also to suit different grades of fuel employed. Care must be taken, however, in locating the dam and in disposing its angle with respect to the grate and its height that the resistance to the progressive movement of the fuel afforded thereby does not overcome the friction between the grate and the fuel-bed, in which latter event the movement of the fuel would be wholly arrested.

Figures 13, 14:
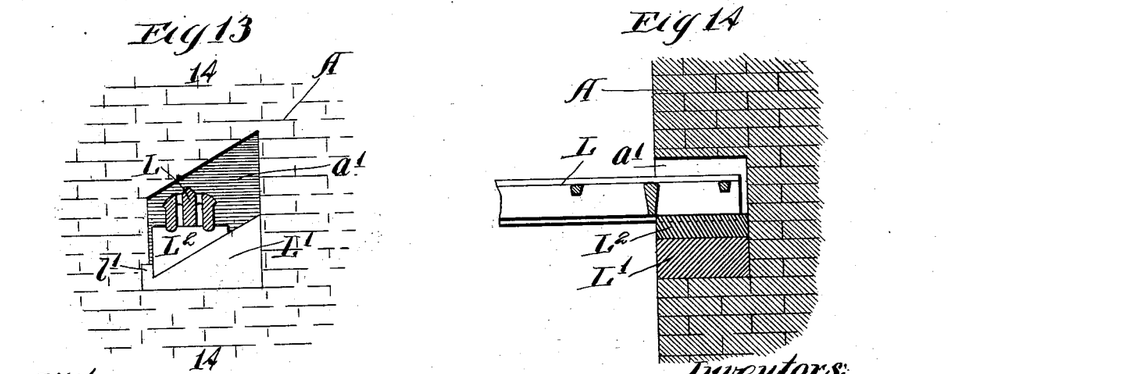
Fig. 13 illustrates means for movably mounting the supports for the retarding device at the rear end of the grate, constructed to permit the device to yield rearwardly.
Fig. 14 is a vertical section on line 14 14 of Fig. 13.

Desirably the girder L is supported in the side walls of the furnace in a manner permitting a slight rearward or upward movement or yielding thereof. The purpose of so connecting the girder with the furnace-walls is to enable the dam as a whole to move upwardly and rearwardly from the grate to be disengaged therefrom in the event of one or more of the bars constituting the dam coming in contact with a projection rising above the fire-surface of the grate, and to thereby prevent breakage of the parts in such an event. The construction shown for effecting this result is made as follows: L', Figs. 13 and 14, designates a metal block immovably embedded in the side wall of the furnace, two of said blocks being used to support the opposite ends of the girder L. Said blocks are provided with rearwardly-inclined top surfaces, and supported on said inclined surfaces are movable blocks $L^2$, with which the ends of the girders are directly engaged, said blocks $L^2$ being inclined on their lower surfaces to correspond with the upper surfaces of the blocks L'. The recesses $a'$ in the walls of the furnace to receive the blocks are made longer than the movable blocks $L^2$ and of such height at their rear ends as to permit said movable blocks and the supported girder to move rearwardly and upwardly a desired distance. When undue rearward pressure is exerted against the dam, due to accidental engagement of a part of the grate with the dam, the dam moves bodily rearward and upwardly, and when the excessive pressure is relieved the dam by its weight and the weight of the fuel-bed thereon will return to its normal or forward position. It will be understood that the weight of the dam and the fuel resting thereon is such as to prevent the dam moving rearwardly under ordinary pressure due to the rearward progress of the fuel-bed. The upper surfaces of the movable blocks are shaped to interfit with the lower surface of the girder, and the forward ends of the stationary blocks are provided with stops $l'$ to limit the forward or return movement of the block $L^2$ and supported girder without imparting undue shock to the walls of the recesses containing said parts.

Figure 11:
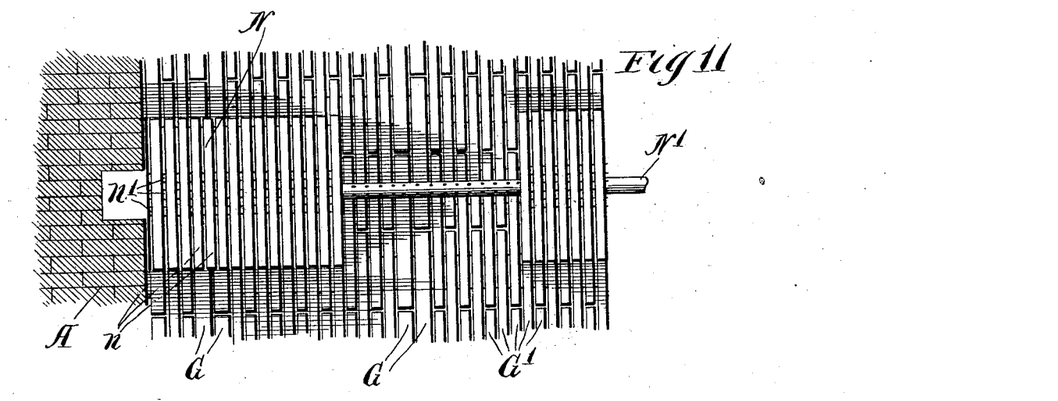
Fig. 11 is a fragmentary plan view of an initial retarding device, located near the fire-arch of the furnace.
Figure 12:
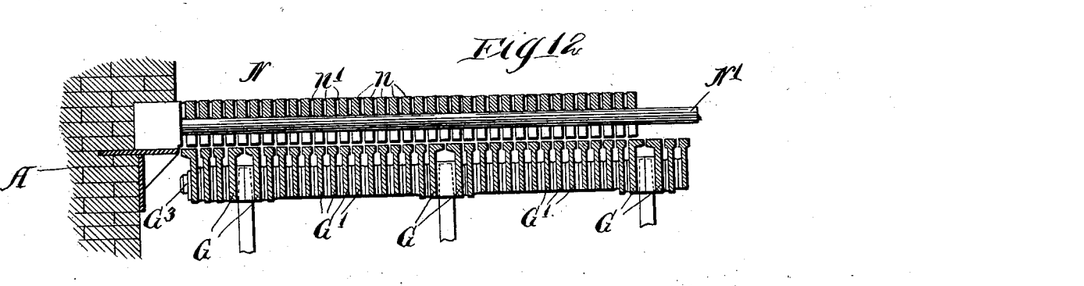
Fig. 12 is a vertical section of the parts shown in Fig. 11.

When burning coal having a large percentage of fixed carbon, it may be necessary to provide, in addition to the dam described, a lesser obstruction located in advance of said dam for the purpose of initially breaking up and agitating the masses of burning fuel on the grate. For this purpose we have shown in Fig. 1 a smaller dam N located between the main dam and the fire-arch. Said dam consists of a plurality of bars $n$, Figs. 11 and 12, having angularly-disposed arms arranged to constitute, when assembled, oppositely-inclined planes, said bars being permanently connected by integral webs $n'$. Said dam is supported at its ends in the side walls of the furnace, with the lower ends of the bars out of contact with the grate. Said dam may, if desired, be supported at its ends in a manner to permit relief against excessive rearward pressure by devices such as are shown in connection with the girder L. In order to insure a sufficient supply of air to said dam and to the part of the fuel-bed resting thereon to avoid liability of the bars being burned out by excessive heat, a steam-pipe $N'$ is located beneath said dam at the lower angle thereof and adapted to be connected with a source supplying steam. Said pipe is perforated at its upper part to direct steam against the lower side of the dam and induce a free supply of air to the parts surrounding said dam. Desirably, also, a steam-pipe O, similarly connected with a source supplying steam, is located beneath the forward ends of the arms K to $K^3$, constituting the larger or rearmost dam. Said pipe is perforated in its upper part, so as to direct the steam to the forward ends of said bars and the portion of the fuel-bed resting thereon. Said pipe O is provided with a supply-pipe $O'$, leading to the forward end of the grate and adapted there to be connected with a pipe leading from a source of steam-supply.

In order to provide ample space for the discharge of the ashes from the grate into the ash-pit below and also to prevent an excessive volume of air passing through said discharge-space into the combustion-chamber, damper-plates P are suspended from the bridge-wall in rear of the bars K to $K^3$ and arranged to swing toward and from said arms. Said plates are suspended from hooks $a$, which are formed on or attached to a ledge-plate $A^2$, embedded in the bridge-wall. Said plates P are provided on their upper edges with rearwardly-directed flanges, in which are formed openings $p$, through which the hooks $a$ on the ledge-plate pass. Desirably the plates are provided at their points of support with bearing-blocks $p'$, with which the hooks $a$ are directly engaged. Said plates are provided with a plurality of air-apertures $p^2$, which prevent said plates from warping. The plates are also provided at their lower edges with the usual slits $p^3$ to prevent warping. Said damper-plates rest by gravity against the rear ends of the bars K to $K^3$ and swing rearwardly therefrom by the force of the rearwardly-moving fuel-bed to permit the ashes to drop from the rearwardly-inclined surfaces formed by said bars K to $K^3$.

In Fig. 9 we have shown a modification of the construction for discharging the ashes from the grate to the ash-pit. In this construction the ashes are discharged into a transverse chamber $B'$, formed between the bridge-wall B and a vertical wall $B^2$, located in front and parallel with the bridge-wall and closely adjacent to the rear end of the grate. Said wall $B^2$ is provided at its base with one or more arched openings $B^3$, which enables the ashes to be removed from said passage $B'$ through the ash-pit. Located in said passage is a horizontal damper R, constructed of one or more plates of such width as to nearly fill the space between the adjacent walls B and $B^2$. Said damper is supported on a centrally-located rock-shaft $R'$, which has bearing in the walls of the furnace and one end of which is adapted to extend outside the furnace in position for manual engagement. The normal position of the damper is horizontal, as shown in said Fig. 9, and in this position the damper catches and retains the ashes as they are discharged from the grate. The damper is rocked from time to time to dump the ashes resting thereon to the bottom of the passage $B'$, from whence they may be removed through the ash-pit in the usual manner.

An important advantage gained by the use of our invention is that it insures the maintenance of the fuel-bed in condition for the most effective supply of air thereto, and thereby insures good combustion.

Another important advantage of the invention is its capability of being adapted to different classes of coal, and thereby enables uniform results to be attained with the use of widely-different grades of coal. The use of the invention, moreover, renders unnecessary the introduction into the furnace of any manually-operated stoking devices, such as slicing-bars and the like, or to otherwise interfere with the draft or operation of the furnace in any manner, so that it is possible to maintain a constant furnace heat. Our invention used in conjunction with regulable fuel-feeding devices therefore enables us to maintain the three constants essential to good combustion—to wit, a constant fuel-supply, a constant air-supply, and a constant furnace heat.

While our invention is shown in connection with a traveling chain-grate, yet a retarding device operating generally in the manner described may be applicable to some forms of grates adapted for giving a bodily progressive movement to or for carrying the fuel other than a chain-grate, and it is to be understood that the term "fuel-carrying grate" as used in the appended claims is intended to include any form of grate adapted to give progressive movement to the fuel which is capable of use in connection with a dam or equivalent means affording resistance to the progressive movement of the fuel.

We claim as our invention—

1. A fuel-carrying grate provided with retarding means for affording resistance to the progressive movement of the fuel on the grate, said means being constructed to permit the passage of air therethrough.

2. A fuel-carrying grate provided with a transversely-arranged dam of open-work construction affording resistance to the progressive movement of the fuel on the grate.

3. A fuel-carrying grate provided with a transverse dam of open-work construction having an inclined surface which rises from the grate and which affords resistance to the progressive movement of the fuel resting thereon.

4. The combination with a fuel-carrying grate of a transverse dam located in the path of the fuel on the grate, said dam being apertured to afford a supply of air through said dam to the fuel resting thereon.

5. The combination with a fuel-carrying grate, of a transverse dam of open-work construction located in the path of the fuel, said dam rising obliquely upward from the grate at its side toward which the fuel moves.

6. The combination with a fuel-carrying grate, of a transverse dam of open-work construction located in the path of the fuel, said dam consisting of two oppositely-inclined parts, the forward one of which rises from the grate-surface, and the rearward one of which projects over the ash-pit.

7. The combination with a fuel-carrying grate, of a transverse dam located in the path of the fuel, said dam consisting of two oppositely-inclined parts, the forward one of which rises from the grate-surface, and the rearward one of which projects over the ash-pit, said dam being formed to afford a plurality of air-spaces extending therethrough to provide for passage of air upwardly through the dam.

8. The combination with a fuel-carrying grate, of a transverse dam located in the path of the fuel, said dam rising obliquely upwardly from the grate-surface, and being constructed of a plurality of longitudinally-arranged bars, separated by spaces to permit the passage of air upwardly between the same.

9. The combination with a fuel-carrying grate, of a transverse dam located in the path of the fuel, said dam rising obliquely upwardly from the grate-surface, and being constructed of a plurality of parts separated to permit the passage of air upwardly between the same and some of which are movable for agitating the fuel.

10. The combination with a fuel-carrying grate, of a transverse dam, consisting of a plurality of separate bars provided with two angularly-disposed arms, and means for supporting said bars above the grate, said bars being constructed to form, when assembled, oppositely-inclined surfaces, one of which rises from the grate, and the bars being separated by spaces to afford air-passages between the same.

11. The combination with a fuel-carrying grate, of a transverse dam consisting of a plurality of bars provided each with two angularly-disposed arms separated to provide air-spaces between the same and means for supporting said bars above the grate, said bars being constructed to form, when assembled, two oppositely-inclined surfaces, one of which rises from the grate, some of said bars being vertically movable.

12. The combination with a fuel-carrying grate, of a transverse dam consisting of a plurality of independent bars each provided with two angularly-disposed arms separated to provide air-spaces between the same, and a girder supporting said bars above the grate, said bars being constructed to form two oppositely-inclined surfaces one of which rises from the grate, some of said bars being movably supported on the said girder.

13. The combination with a fuel-carrying grate, of a transverse dam, embracing a plurality of bars having angularly-disposed arms, a girder located transversely over the grate for supporting said bars, said bars constituting oppositely-disposed inclined surfaces, the forward one of which rises from the grate, and complemental curved bearing-surfaces on the bars and girders, the curved surfaces of the bars constituting arcs of circles whose centers coincide with the points of engagement of the bars with the grate.

14. The combination with a fuel-carrying grate, of a transverse dam embracing a plurality of bars, a girder located transversely over the grate for supporting said bars, a portion of said bars being movable with respect to, and having interlocking connection with the girder, and means for actuating said movable bars.

15. The combination with a fuel-carrying grate, of a transverse dam embracing a plurality of bars, a girder located transversely over the grate for supporting said bars, some of said bars being movable in vertical planes and means for actuating the movable bars, said girder and the movable bars having complemental curved guiding-surfaces.

16. The combination with a fuel-carrying grate, of a transverse dam comprising a plurality of bars each consisting of two angularly-disposed arms, a girder located transversely over the grate and engaging said bars at the angle thereof to support the same, said bars being separated to provide air-spaces between the same, and the girder being of open construction to provide air-passages therethrough.

17. The combination with a furnace and a grate therein constructed to carry the fuel therethrough during combustion, of a transverse dam of open-work construction located in the path of the fuel for retarding the movement of said fuel, and a damper located between the discharge end of the grate and the ash-pit.

18. The combination with a furnace and a grate therein constructed to carry the fuel therethrough during combustion, of a transverse dam composed of two oppositely-inclined parts of open-work construction, one of which rises upwardly from the grate-surface, and the other of which overhangs the ash-pit of the furnace, and a damper located between the discharge end of the grate and the ash-pit.

19. The combination with a furnace and a grate therein constructed to carry the fuel therethrough during combustion, of a transverse dam of open-work construction which overhangs the ash-pit of the furnace, and a damper-plate which is supported from the furnace-wall to swing toward and from said dam and which tends to rest by gravity against the rear part of said dam.

20. The combination with a furnace and a grate therein constructed to carry the fuel therethrough during combustion, of a transverse dam of open-work construction which overhangs the ash-pit of the furnace, a damper-plate, a ledge-plate embedded in the wall of the furnace and provided with hooks on which said damper-plate is suspended said damper-plate being adapted to swing toward and from the dam and tending by the action of gravity to rest against said dam.

21. The combination with a fuel-carrying grate, of a transverse dam comprising a plurality of bars having angularly-disposed arms, a girder located transversely over the grate for supporting said bars, some of said bars being movable and the other stationary, and lateral projections on said movable bars adapted for engagement with the lower margins of the stationary bars.

22. A fuel-carrying grate provided with a transverse dam which rises from the grate and affords a resistance to the progressive movement of the fuel on the grate, said dam having a limited upward and rearward movement.

23. The combination with a furnace, of a fuel-carrying grate, provided with a transverse dam which rises obliquely upward from the surface of the grate, and embracing a girder supported in walls of the furnace, said girder having a limited rearward and upward movement.

24. The combination with a furnace, of a fuel-carrying grate, provided with a transverse dam which rises obliquely upward from the surface of the grate and embracing a girder supported in the walls of said furnace, stationary blocks embedded in the walls of the furnace having oblique upper surfaces, and movable blocks directly supporting said girder and resting on said oblique surfaces of the stationary blocks.

25. A fuel-carrying grate provided with a transverse dam of open-work construction which rises from the surface of the grate with its rear end extending over the ash-pit of the furnace and a lesser dam located between the first-mentioned dam and the fuel-receiving end of the grate.

26. The combination with a fuel-carrying grate, of a transverse dam located in the path of the fuel, said dam rising obliquely upwardly from the grate-surface and having spaces for the passage of air therethrough, and a steam-pipe located in position to direct jets of steam at or near the forward end of said dam.

27. The combination with a traveling grate the fuel-supporting surface of which is formed by pivotally-connected link-bars and which passes over supporting-wheels at the rear end of the grate, of a dam embracing a plurality of bars some of which are movable and means for moving the said bars comprising arms on the bars located in position for engagement with link-bars of the grate as said link-bars pass over said supporting-wheels.

In testimony that we claim the foregoing as our invention we affix our signatures in presence of two witnesses.

WILLIAM M. GREEN.
JOHN R. GENT.
HERMAN A. POPPENHUSEN.

Witnesses:
C. CLARENCE POOLE,
LEON H. COOPER.